(12) United States Patent
Clothier et al.

(10) Patent No.: US 7,794,142 B2
(45) Date of Patent: Sep. 14, 2010

(54) MAGNETIC ELEMENT TEMPERATURE SENSORS

(75) Inventors: Brian L. Clothier, Wichita, KS (US); Edwin T. Abbett, Carmel, IN (US)

(73) Assignee: TSI Technologies LLC, Wichita, KS (US)

( * ) Notice: Subject to any disclaimer, the term of this patent is extended or adjusted under 35 U.S.C. 154(b) by 563 days.

(21) Appl. No.: 11/619,066

(22) Filed: Jan. 2, 2007

(65) Prior Publication Data

US 2007/0263699 A1 Nov. 15, 2007

Related U.S. Application Data

(60) Provisional application No. 60/836,448, filed on Aug. 9, 2006, provisional application No. 60/818,385, filed on Jul. 5, 2006, provisional application No. 60/798,591, filed on May 9, 2006.

(51) Int. Cl.
*G01K 7/00* (2006.01)

(52) U.S. Cl. .................. 374/163; 374/176; 374/120

(58) Field of Classification Search .............. 374/100, 374/120, 176, 166, 183, 137, 29, 163, 177, 374/141; 219/600, 635, 9; 324/219, 224–226, 324/228, 244, 260, 263; 148/566–568; 422/119, 422/121, 125; 116/216
See application file for complete search history.

(56) References Cited

U.S. PATENT DOCUMENTS 3,521,257 A 7/1970 Nelson
4,134,538 A 1/1979 Lagarde et al.

(Continued)

FOREIGN PATENT DOCUMENTS

JP 358155322 9/1983

(Continued)

OTHER PUBLICATIONS

U.S. Appl. No. 60/798,591; entitled Glass-Coated Amorphous Magnetic Microwire Temperature Sensors.

(Continued)

*Primary Examiner*—Gail Verbitsky
(74) *Attorney, Agent, or Firm*—Hovey Williams LLP

(57) ABSTRACT

Small, low-cost wireless temperature sensors (26,64,96) are provided for sensing the temperature of an object (44). The temperature sensors (26,64,96) preferably include a plurality of individual, magnetically susceptible temperature sensor elements (28-34,66,92), as well as optional magnetic field-responsive data elements (38,40,20) adapted for attachment to object (44) or to a substrate (82) in turn attached to object (44). The temperature sensor elements (28-34,66,92) preferably have magnetic bodies (22,70) exhibiting a re-magnetization response under the influence of an applied alternating magnetic field, which is different below and above a set point temperature, normally the Curie temperature of the magnetic body (22) or an adjacent sheath (74,94). The temperature sensors (26,64,96) are used in conjunction with a detector (46) operable to generate a magnetic field of magnitude sufficient to cause re-magnetization responses of the temperature sensor elements (28-34,66,92) and optional data elements (38,40,20), to detect such responses, and to use the detected responses to determine the temperature of object (44) by means of a decoding algorithm. The temperature sensors (26,64,96) can be used in closed-loop heating systems (98) capable of controlling the heating of an object (114).

13 Claims, 5 Drawing Sheets

U.S. PATENT DOCUMENTS

| | | | |
|---|---|---|---|
| 4,203,544 | A | 5/1980 | Guilgue |
| 4,484,184 | A | 11/1984 | Gregor et al. |
| 4,493,981 | A | 1/1985 | Payne |
| 4,919,950 | A | 4/1990 | Mak |
| 5,096,725 | A | 3/1992 | Kim |
| 5,132,918 | A | 7/1992 | Funk |
| 5,300,757 | A | 4/1994 | Hara et al. |
| 5,545,877 | A | 8/1996 | Shelton |
| 5,722,317 | A * | 3/1998 | Ghiron et al. ............... 99/452 |
| 5,729,201 | A | 3/1998 | Jahnes et al. |
| 5,775,810 | A | 7/1998 | Shin |
| 5,954,984 | A | 9/1999 | Ablah et al. |
| 6,042,264 | A | 3/2000 | Prusik et al. |
| 6,051,070 | A | 4/2000 | Sunter |
| 6,166,538 | A * | 12/2000 | D'Alfonso ............... 324/228 |
| 6,208,253 | B1 | 3/2001 | Fletcher et al. |
| 6,232,585 | B1 | 5/2001 | Clothier et al. |
| 6,270,591 | B2 | 8/2001 | Chiriac et al. |
| 6,274,856 | B1 | 8/2001 | Clothier et al. |
| 6,303,165 | B1 | 10/2001 | Karner |
| 6,316,753 | B2 | 11/2001 | Clothier et al. |
| 6,320,169 | B1 | 11/2001 | Clothier |
| 6,441,737 | B1 | 8/2002 | Antonenco et al. |
| 6,444,961 | B2 | 9/2002 | Clothier et al. |
| 6,462,316 | B1 | 10/2002 | Berkcan et al. |
| 6,504,135 | B2 | 1/2003 | Clothier et al. |
| 6,556,139 | B2 | 4/2003 | Manov et al. |
| 6,566,636 | B1 | 5/2003 | Bentley et al. |
| 6,622,913 | B1 | 9/2003 | Antonenco et al. |
| 6,657,170 | B2 | 12/2003 | Clothier et al. |
| 6,664,520 | B2 | 12/2003 | Clothier et al. |
| 6,747,559 | B2 | 6/2004 | Antonenco et al. |
| 6,774,346 | B2 | 8/2004 | Clothier et al. |
| 6,776,523 | B2 | 8/2004 | Simunovic et al. |
| 6,806,808 | B1 * | 10/2004 | Watters et al. ........... 340/10.41 |
| 6,822,204 | B2 | 11/2004 | Clothier et al. |
| 6,909,395 | B1 | 6/2005 | Carpenter |
| 6,953,919 | B2 | 10/2005 | Clothier |
| 7,011,911 | B2 | 3/2006 | Kim et al. |
| 7,227,108 | B2 | 6/2007 | Clothier et al. |
| 7,233,479 | B2 | 6/2007 | Liebermann |
| 2002/0070862 | A1 | 6/2002 | Francis et al. |
| 2002/0097777 | A1 | 7/2002 | Ronchi |
| 2003/0052166 | A1 | 3/2003 | Nguyen |
| 2005/0011883 | A1 | 1/2005 | Clothier et al. |
| 2005/0109435 | A1 | 5/2005 | Liebermann |
| 2005/0237197 | A1 | 10/2005 | Liebermann |
| 2005/0247696 | A1 | 11/2005 | Clothier |
| 2005/0256774 | A1 | 11/2005 | Clothier |
| 2006/0226832 | A1 * | 10/2006 | Ikeda et al. ............... 324/204 |
| 2008/0197126 | A1 * | 8/2008 | Bourke et al. ............ 219/634 |

FOREIGN PATENT DOCUMENTS

| | | | |
|---|---|---|---|
| JP | 360069527 | | 4/1985 |
| JP | 61140106 A | * | 6/1986 |
| JP | 363313880 | | 12/1988 |
| JP | 403205576 | | 9/1991 |
| JP | 404099935 | | 3/1992 |
| JP | 06277491 | | 10/1994 |
| JP | 2004103286 | | 2/2004 |
| WO | 9406553 | | 3/1994 |

OTHER PUBLICATIONS

U.S. Appl. No. 60/818,385; entitled Glass-Coated Amorphous Magnetic Microwire Temperature Sensors.
U.S. Appl. No. 60/836,448; entitled Glass-Coated Amorphous Magnetic Microwire Temperature Sensors.
U.S. Appl. No. 60/881,866; entitled Microwire-Controlled Autoclave and Method.
U.S. Appl. No. 60/919,345; entitled Microwire-Controlled Servingware Warming System and Method.
U.S. Appl. No. 11/619,066; entitled Magnetic Element Temperature Sensors.
U.S. Appl. No. 11/745,348; entitled Magnetic Element Temperature Sensors.
Horac Chirac; Preparation and Characterization of Glass Covered Magnetic Wires; Materials Science and Engineering A304-306, 166-71 (2001).
Donald et al.; The Preparation, Properties and Applications of Some Glass Coated Metal Filaments Prepared by the Taylor-Wire Process; Journal of Material Science, 31, 1139-48 (1996).
Wiesner and Schneider; Magnetic Properties of Amorphous Fe—P Alloys Containing Ga, Ge, and As; Phys. Stat. Sol. (a) 26, 71 (1974).
Antonenko et al.; High Frequency Properties of Glass-Coated Microwires; Journal of Applied Physics, vol. 83, 6587-89.
Henry et al.; Magnetic measurement of Iron-Rich Amorphous Alloys Containing Chromium: Mossbauer Study and B-H Loops; Journal of Material Science 19: 1000-06 (1984).
V. Zhukova et al.; Development of thin microwires with low curie temperature for temperature sensors applications; Sensors and Actuators B; Cheimcal (2007); doi:10.1016/j.snb.2007.02.019.
Fletcher et al.; Remote Interrogated Temperature Sensors Based on Magnetic Materials; IEEE Transactions on Magnetics; vol. 36, No. 5, Sep. 2000.
Zhukova et al. Studies of Magnetic Properties of Thin Microwires with Low Cure Temperature; Journal of Magnetism and Magnetic Materials 300, 16-23 (2006).
D. Makhnovskiy et al.; Remote Microwave Testing of Stress and Temperature Distributions in Composite Materials Incorporating Ferromagnetic Wires; School of Computing, Communications and Electronics, University of Plymouth, Drake Circus, Plymouth, Devon PL4 8AA, UK; Jun. 2007.
International Search Report and Written Opinion dated Aug. 8, 2007; PCT/US2005/33586.
International Search Report and Written Opinion dated Feb. 4, 2008; PCT/US2005/33596.
International Search Report and Written Opinion dated May 19, 2008; PCT/US2007/60032.
International Search Report and Written Opinion dated Jun. 12, 2008; PCT/US2008/051827.
International Search Report and Written Opinion dated Jun. 3, 2008; PCT/US2007/68483.
Office Action dated Oct. 19, 2007 in U.S. Appl. No. 11/061,345, filed Feb. 18, 2005 entitled Food Preparation System.
Final Rejection dated Apr. 1, 2008 in U.S. Appl. No. 11/061,345, filed Feb. 18, 2005 entitled Food Preparation System.
Office Action dated Jan. 24, 2008 in U.S. Appl. No. 11/083,432, filed Mar. 18, 2005 entitled Boil Detection Method and Computer Program.

* cited by examiner

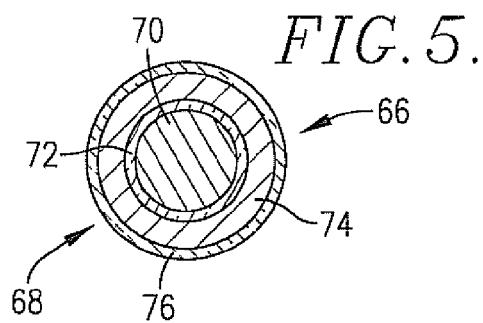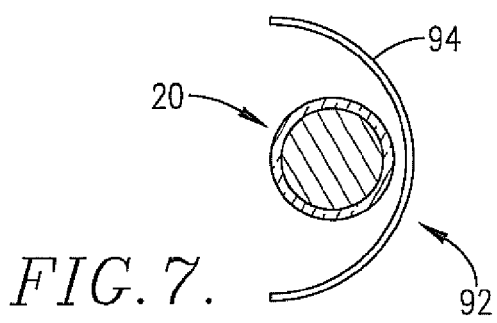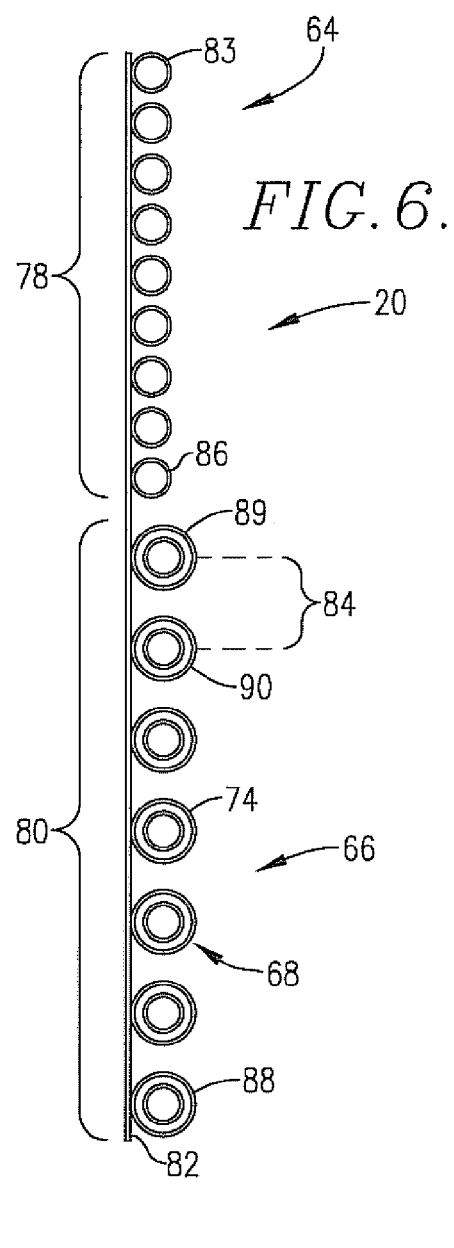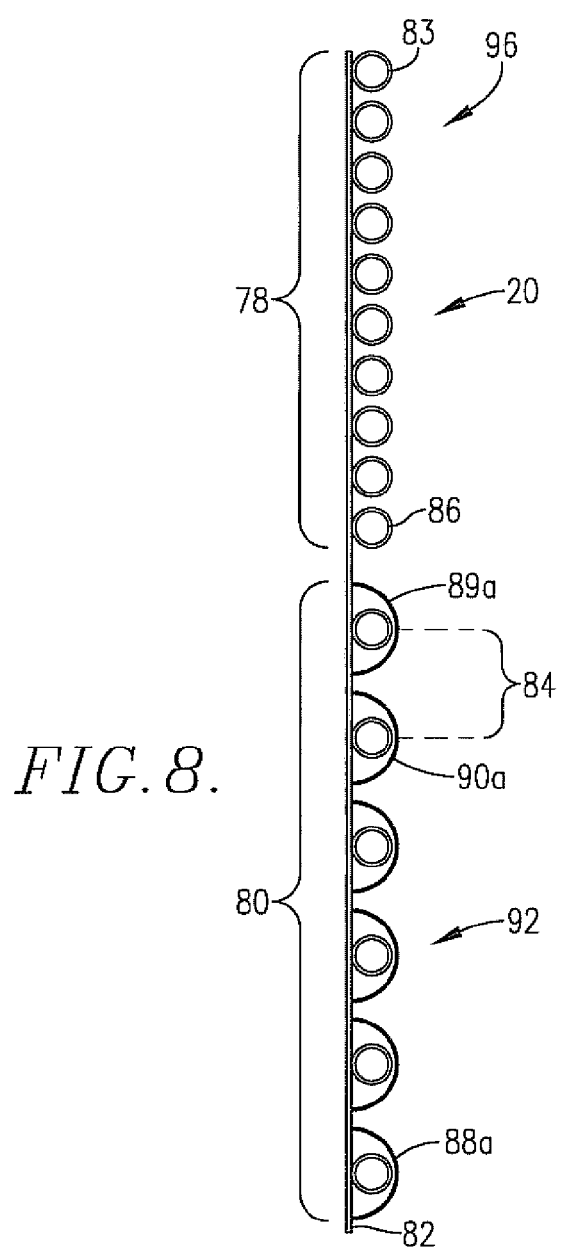

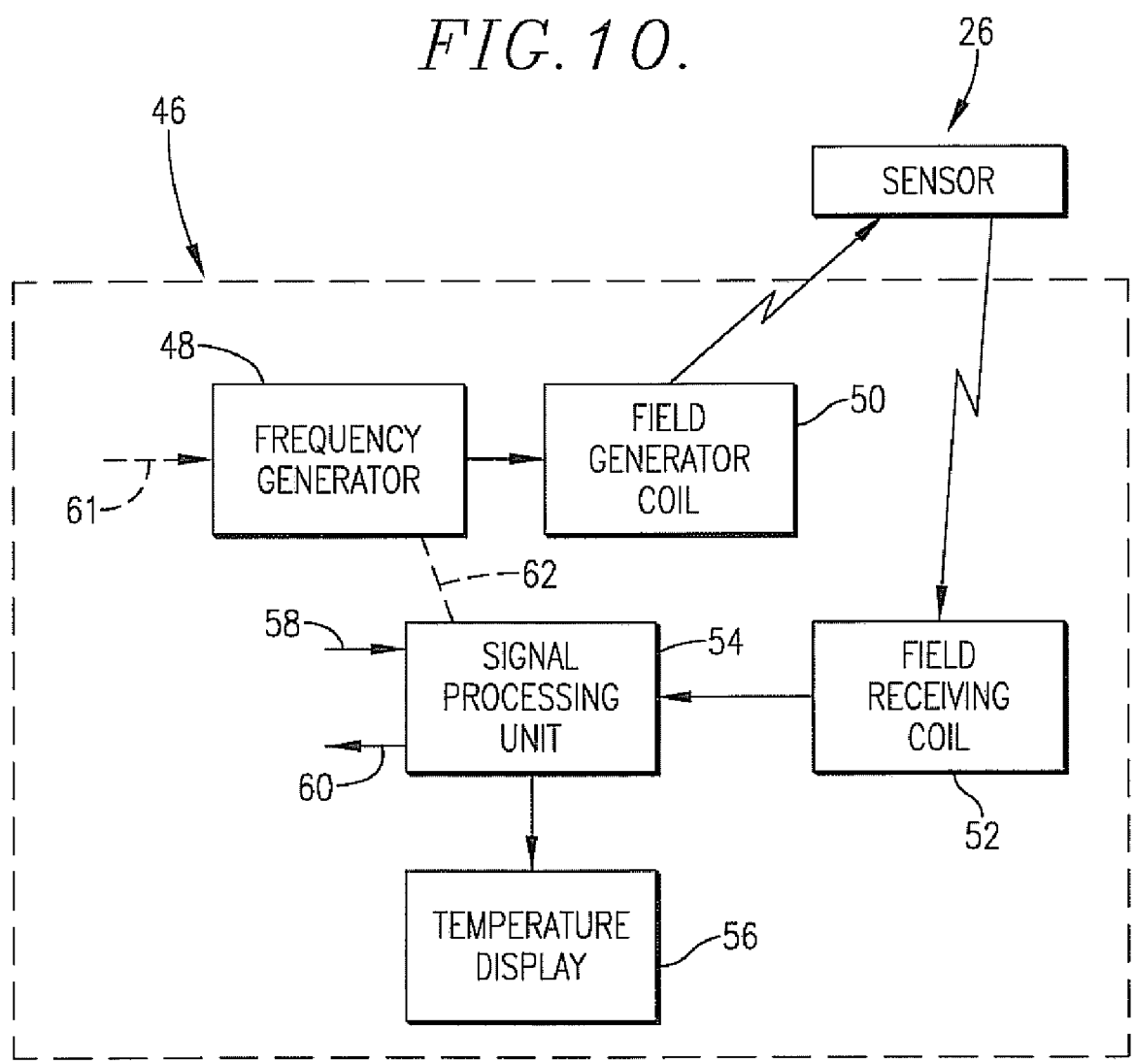

MAGNETIC ELEMENT TEMPERATURE SENSORS

CROSS REFERENCE TO RELATED APPLICATIONS

This application claims the benefit of Application Ser. No. 60/836,448, filed Aug. 9, 2006, Application Ser. No. 60/818,385, filed Jul. 5, 2006, and Application Ser. No. 60/798,591 filed May 9, 2006. Each of the foregoing applications is incorporated by reference herein.

BACKGROUND OF THE INVENTION

1. Field of the Invention

The present invention is broadly concerned with magnetic element temperature sensors, detectors for use with such sensors, closed-loop heating systems making use of the sensors and detectors to wirelessly determine the temperature of an object and to control the object's temperature, and corresponding methods. More particularly, the invention is concerned with temperature sensors made up of at least one magnetically susceptible sensor element, preferably formed of amorphous or nanocrystalline metal, and having a re-magnetization response under the influence of an applied alternating magnetic field which is different below and above at least one set point temperature, such as the Curie temperature of the sensor element. These temperature sensors can be used with con-elated detectors for temperature sensing, and as a part of closed-loop heating systems.

2. Description of the Prior Art

A variety of applications for temperature sensors that can be read wirelessly exist in the marketplace. These applications vary from sensing and reporting the internal temperature of livestock to being part of a closed-loop temperature feedback system that allows a magnetic induction heater to precisely control the temperature of insulated food delivery boxes. Many of these applications are disclosed in U.S. Pat. Nos. 5,954,984, 6,232,585, 6,320,169, and 6,953,919.

Many of those applications are currently being served by Radio Frequency Identification (RFID) temperature sensing systems. These RFID temperature sensing systems include an RFID reader and its associated RFID "tag," whereby the tag has some type of temperature sensor as part of its circuitry.

These prior RFID systems tend to be relatively expensive owing to the cost of the tags, and are unable to operate continuously in excess of 125° C. Moreover, they lack the ability to transmit information in the vicinity of metal or other conducting materials, particularly when the RFID tag is embedded within the conducting material.

Magnetic element markers (or "tags") are commonly used as part of an electronic article surveillance (EAS) systems or other authentication systems. These markers or tags are passive, typically small, less expensive than RFID tags, can operate at high temperatures, and in some forms, can transmit their information wirelessly to a detector even when embedded within a conductor.

For example, EAS markers or tags made of soft magnetic amorphous alloy ribbons are disclosed in U.S. Pat. No. 4,484,184. These ribbons have a composition consisting essentially of the formula $M_a N_b O_c X_d Y_e Z_f$, where M is at least one of iron and cobalt, N is nickel, O is at least one of chromium and molybdenum, X is at least one of boron and phosphorous, Y is silicon, Z is carbon, "a"-"f" are in atom percent, a ranges from about 35-85, b ranges from about 0-45, c ranges from about 0-7, d ranges from about 5-22, e ranges from about 0-15 and f ranges from about 0-2, and the sum of d+e+f ranges from about 15-25. The marker ribbons are capable of producing field perturbations at frequencies which are harmonics of the frequency of an incident alternating magnetic field produced by a field transmitter. A detecting means is arranged to detect magnetic field perturbations at selected tones of the harmonics produced in the vicinity of the interrogation zone by the presence of the marker therewithin. Generation of harmonics by the marker is caused by nonlinear magnetization response of the marker to an incident magnetic field.

There is a need in the art for wireless temperature sensing systems using small, less expensive temperature sensing elements, that can operate continuously at temperatures in excess of 125° C., and that have the ability to transmit information even in the vicinity of metal or other conducting materials. Furthermore, it would be advantageous if such improved temperature sensing elements were able to carry predetermined data relating to the sensor itself or to the object to be temperature sensed, e.g., the identity of the object, object characteristics, or heating instructions. Finally, advantages would be realized if the sensing elements could be used as a part of a closed-loop feedback heating system able to control the output of a heating device and thus control the temperature of an object.

SUMMARY OF THE INVENTION

The present invention provides a wholly new class of temperature sensors, methods of temperature sensing and closed-loop heating systems. The invention is predicated upon the discovery that reliable temperature sensing can be obtained through use of magnetic temperature sensing elements, each having a characteristic re-magnetization response under the influence of an applied alternating magnetic field, wherein the responses are temperature-sensitive and can be readily monitored.

In more detail, a preferred temperature sensor is configured for placement in thermal contact with an object in order to sense the temperature thereof and comprises at least one magnetically susceptible sensor element having a re-magnetization response under the influence of an applied alternating magnetic field, the re-magnetization response being defined by at least one short, detectible pulse of magnetic field perturbation of defined short duration and which is different below and above at least one set point temperature. Preferably, the set point temperature is the Curie temperature of the sensor element, or a temperature close (usually within about 25° C.) of this Curie temperature. In most applications, the set point temperature is below about 400° C.

When such a temperature sensor element is placed in thermal contact with an object to be temperature-sensed, and an alternating magnetic field is applied to the sensor element of sufficient magnitude to cause the desired re-magnetization response, the sensor element operates in the manner of a "temperature switch." That is, when the object is below the set point temperature of the sensor element, a re-magnetization response from the sensor element is observed; when the object temperature reaches or exceeds the set point temperature, either no re-magnetization response is observed, or the response is altered.

Normally, temperature sensors in accordance with the invention make use of a plurality of sensor elements each having a different set point temperature than the other sensor elements. Preferably, these plural sensor elements are designed to have successive different set point temperatures which vary from lowest to highest and in at least a somewhat uniform fashion, so that the temperature of the object can be monitored over a range of temperatures corresponding to the design of the temperature sensors. In such a situation, the magnitude of the differences between adjacent set points defines the resolution of the temperature sensor.

In order to most effectively make use of the temperature sensor of the invention, use is made of a detector correlated with the sensor elements. Such a detector generally has a device for generating an alternating magnetic field of sufficient magnitude to interrogate the sensor elements (i.e., to cause re-magnetization responses of the sensor elements based upon the temperature of the object), and a device for detecting such responses. In practice, the detector has a magnetic field generator coil and a field receiving coil both coupled with a signal processing unit. In use, the detector generates the requisite alternating magnetic field, and the field receiving coil detects the re-magnetization responses of the sensor elements, issuing output signals to the signal processing unit. The signal processing unit, preferably in the form of a digital microprocessor, employs a decoding algorithm which allows determination of the object temperature. In preferred forms, the decoding algorithm comprises one or more look-up tables correlating the re-magnetization responses of the sensor elements with object temperature.

The magnetically susceptible sensor elements are advantageously formed as metallic bodies in an amorphous or nanocrystalline state. Such metallic bodies are preferably in the form of very thin elongated wires or strips having a maximum cross-sectional dimension (e.g., diameter) of up to about 100 μm and can be produced in a variety of manners. One particularly suitable form of the metallic bodies is the microwire form, comprising an inner metallic core and an optional outer glass coating. Such microwires can be produced by the well-known Taylor method or as water-cast amorphous bodies. However, it is not necessary to make use of microwires in the context of the invention, so long as the sensors include the requisite magnetically susceptible sensor elements.

In another aspect of the invention, new microwire-based composite or combination microwires are provided. In such constructions, an inner microwire made up of an elongated metallic body is shielded by means of an adjacent ferromagnetic sheath of known Curie temperature, which prevents or at least alters the re-magnetization response of the associated microwire metallic body at temperatures below the sheath Curie temperature (or at a known temperature close to the sheath Curie temperature). The sheath may be located in surrounding relationship with the inner microwire, or at least partially disposed about the inner microwire in spaced relationship therefrom. One particularly preferred composite microwire includes an inner most magnetic susceptible microwire body with a surrounding glass casing. The sheath is tubular and surrounds the glass casing, and has an outermost glass casing around the sheath. Such a composite design can readily be produced using a modified Taylor method. Specifically, a pair of inner and outer glass tubes are telescoped together with the magnetically susceptible metal within the inner tube and the ferromagnetic sheath material between the inner and outer tubes. These components are rendered molten and are quickly pulled to create the desired composite structure.

In another aspect of the invention, a method of sensing the temperature of an object is provided. This method broadly comprises the steps of placing a temperature sensor in thermal contact with said object, the sensor comprising at least one magnetically susceptible sensor element having a re-magnetization response under the influence of an applied alternating magnetic field, and wherein the re-magnetization response is different below and above at least one set point temperature. Next, an alternating magnetic field is generated in the region of the sensor and of sufficient magnitude to cause the re-magnetization response of the sensor element. Thereupon, the re-magnetization response of the sensor element is detected and used to at least in part determine whether the temperature of the body (and therefore of the object) is above or below the set point temperature (e.g., other information may be used along with the detected re-magnetization response in the temperature determination).

As noted previously, the sensor normally has a plurality of magnetically susceptible sensor elements, each having a different re-magnetization response under the influence of an applied alternating magnetic field and each re-magnetization response being different below and above a set point temperature, and wherein the set point temperatures of the sensor elements are different from each other. In such a case, the re-magnetization responses of at least certain of the plural sensor elements are detected and used to measure the temperature of the sensor elements and of the object.

Where a sheathed composite or combination microwire sensing element is used, the associated ferromagnetic sheath prevents the re-magnetization responses of the associated microwire body by magnetically saturating or biasing the body until the sensor elements and the object reach a temperature above the Curie temperature, or at some fixed temperature near the Curie temperature, of the ferromagnetic sheath. The extent of magnetic saturation or biasing of the sensor element by the sheath can be designed to yield a series of different or altered re-magnetization responses over a range of temperatures approaching the Curie temperature of the sheath. Assuming that the correlated detector has a sufficient resolution and discrimination, these different or altered responses can be detected and used for temperature sensing. Thus, in such a case a single microwire sensing element can exhibit a plurality of different set point temperatures.

The invention also provides a unique structure and method for selectively measuring the temperature of an object made up of at least a pair of components designed to be placed in proximity to each other, with at least one of the components being heatable. For example, a heater and a correlated heatable consumable item (e.g., an induction heater and a container filled with heatable shaving cream) can be temperature monitored and controlled in accordance with the invention. In such a design an induction-heatable nozzle designed to connect to the container and to heat the fluid exiting the container would be equipped with a temperature sensor in accordance with the invention, whereas the container would be equipped with a magnetic field-responsive data element (e.g., a conventional microwire) correlated with the nozzle-applied temperature sensor. The temperature sensor and data element are correlated such that the re-magnetization response of the temperature sensor can only be decoded if both the temperature sensor and data element are simultaneously subjected to an interrogating alternating magnetic field. This is usually accomplished by altering the decoding algorithm of the detecting device so that it will not detect and report object temperature unless both the temperature sensor and data element are present. When the container is situated on the induction heater for heating purposes, the temperature sensor and data element are in proximity and the re-magnetization responses of the sensor can be detected and used for temperature sensing.

This aspect of the invention is particularly advantageous because the manufacturer of the heater can be assured that only consumable items it also manufactures can be used with the heater; that is, if the consumable item of another manufacturer is used with the heater, no temperature monitoring can occur because that other manufacturer's consumable item does not include the necessary correlated magnetic field-responsive data element. In addition, the heater can be designed so that it will not operate at all unless the appropriate consumable item is used.

The invention also provides systems for heating of objects making use of a temperature sensor in accordance with the invention. Such systems further include apparatus for heating the object, such as an induction or other type heating unit, along with a re-magnetization response detector of the type described. A controller coupled with the detector and heating apparatus is also provided in order to receive output signals from the detector and to control the operation of the heating apparatus in response to such output signals. In these types of systems, the temperature of the object is successively or continuously monitored, and the controller varies the operation of the heating apparatus so as to heat the object or to maintain it in a desired temperature range.

BRIEF DESCRIPTION OF THE DRAWINGS

FIG. 5 is a schematic cross-sectional view of a temperature-sensing element in accordance with a second embodiment of the invention, depicting a glass-coated amorphous microwire magnetic element surround by a cylindrical sheath of a ferromagnetic metal or ferrite material and having a desired Curie temperature;

FIG. 6 is an essentially schematic cross-sectional view of a magnetic temperature sensor in accordance with the invention, making use of microwire data elements of the type illustrated in FIG. 1, and temperature-sensing elements as illustrated in FIG. 5;

FIG. 7 is a schematic cross-sectional view of another temperature sensing element in accordance with a third embodiment of the invention, wherein glass-coated microwire magnetic elements as illustrate in FIG. 1 and located adjacent a shield of ferromagnetic metal or ferrite material having a desired Curie temperature;

FIG. 8 is an essentially schematic cross-sectional view of a magnetic element temperature sensor in accordance with the third embodiment of the invention including data elements as illustrated in FIG. 1 and temperature-sensing elements as illustrated in FIG. 7

FIG. 10 is a schematic block diagram of a temperature reader in accordance with the invention operable to interact with the magnetic element temperature sensors hereof.

DETAILED DESCRIPTION OF THE PREFERRED EMBODIMENTS

Prior Art Magnetic Elements and Detection Systems

In order to best understand the present invention, it is helpful to understand the nature and operation of present-day EAS and authentication systems employing magnetic elements (often referred to as "magnetic markers") and their corresponding detection systems.

One type of magnetic element often used is a glass-coated amorphous microwire. Such microwires, their production, magnetic properties, and behaviors below their Curie temperatures, have been disclosed in the technical and patent literature. See, for example, U.S. Pat. Nos. 6,441,737 and 6,747,559, Horia Chirac, *Preparation and Characterization of Glass Covered Magnetic Wires*, Materials Science and Engineering A304-306, 166-71 (2001); Donald et al., *The Preparation, Properties and Applications of Some Glass Coated Metal Filaments Prepared by the Taylor-Wire Process*, Journal of Materials Science, 31, 1139-48 (1996); Wiesner and Schneider, *Magnetic Properties of Amorphous Fe—P Alloys Containing Ga, Ge, and As*, Phys. Stat. Sol. (a) 26, 71 (1974); and Antonenko et al, *High Frequency Properties of Glass-Coated Microwires*, Journal of Applied Physics, vol. 83, 6587-89. Continuous lengths of microwires have been produced inexpensively by what is generally called in the art the Taylor process whereby either a pre-alloyed ingot or the required elemental constituents are melted in a generally vertically disposed glass tube that is sealed at the bottom. Once the alloy is converted to a molten state, using radio frequency ("rf") heating for example, the softened bottom of the glass tube is grasped and drawn into continuous microwire. Rapid reduction of alloy cross-section, together with use of secondary cooling means, cause the alloy to become amorphous or nanocrystalline during drawing.

Figure 1:
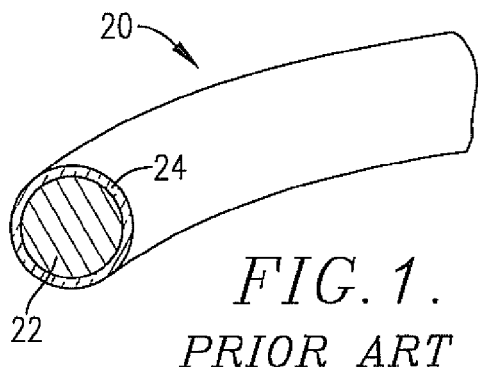
FIG. 1 is a fragmentary view in partial section illustrating a prior art magnetic microwire element suitable for use in the present invention.

A typical microwire 20, anywhere from ten or less microns in total diameter to tens of microns in total diameter, is depicted in FIG. 1. The wire 20 has an alloy core 22, and glass coating 24, wherein the alloy core 22 and the glass coating 24 can be physically coupled to each other continuously or only at several spatially separated points. The glass-to-metal ratio, though variable, can be tightly controlled. For example, the typical thickness of glass-coating 24 may be from about 1-5 microns for a 45-60 micron core diameter microwire, and typically 1-3 microns for 30 micron core diameter microwire. Microwire elements for prior art EAS and authentication tags are usually cut to lengths ranging from 15 mm to 75 mm.

Figure 2:
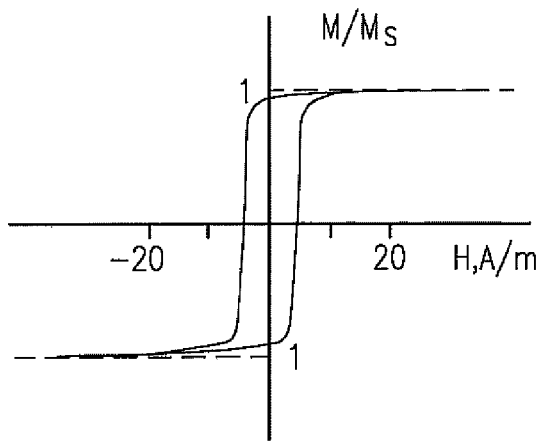
FIG. 2 is a graphical illustration of the magnetic characteristics of a microwire suitable for use in the present invention, at temperatures below the Curie temperature of the microwire alloy.

The microwire magnetic properties and resultant hysteresis loops can be controlled by varying the alloy composition and the glass-to-metal diameter ratio. FIG. 2 illustrates an idealized magnetic hysteresis loop response of a typical microwire 20 with a large Barkhausen discontinuity, suitable for use in the present invention as described below. When such a microwire 20 is exposed to an external alternating magnetic field whose field strength, in the direction opposing the instantaneous magnetic polarization of the element is greater than the coercive force $H_c$, here shown ideally to be less than 10 A/m, the re-magnetization process results in the generation of a harmonically rich pulse that is easily detected. The magnetic flux changes during the pulse give rise to a peak in the flux derivative over time. Accordingly, a voltage peak will be observed in a receiving coil placed in the vicinity of the element and the reader may correlate that voltage peak to the presence of a microwire element in the field.

Prior art glass-coated amorphous microwires 20 produced by the Taylor method can be fabricated so as to exhibit very low coercivities (substantially less than 10 A/m), high relative permeabilities (substantially higher than 20000), substantially zero or slightly positive magnetostrictions, and large Barkhausen discontinuities (which means that the microwires exist essentially only in bimodal magnetic states).

Figure 3A:
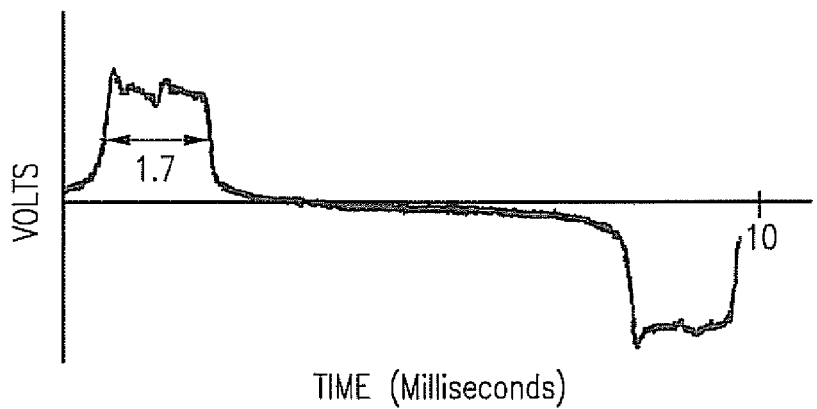
FIG. 3A is a graph of time versus re-magnetization of an amorphous strip typically used in conventional in anti-shoplifting EAS markers or tags.
Figure 3B:
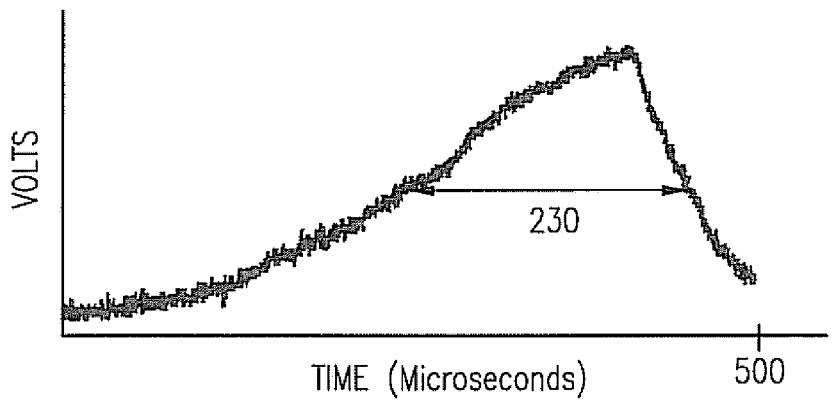
FIG. 3B is a graph of time versus re-magnetization of an amorphous microwire having a large Barkhausen discontinuity, used in the markers or tag commercially available from Sensomatic Co.
Figure 3C:
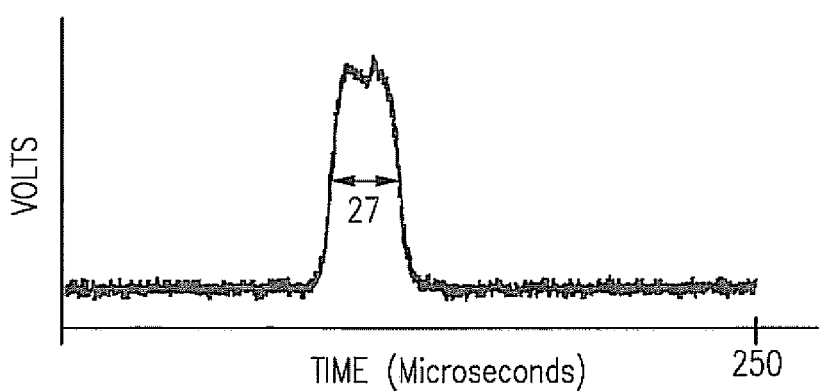
FIG. 3C is a graph of time versus re-magnetization of a glass-coated amorphous magnetic microwire produced by the Taylor method.

The re-magnetization properties of the microwires 20 are also important, and distinguish such microwires from other types of prior art magnetic elements. Referring to FIG. 3C (see U.S. Pat. No. 6,556,139) it will be seen that the re-magnetization peak width (measured at half amplitude level) was in the range of 25-80 micro seconds for a glass-coated amorphous microwire. In contrast (see FIG. 3B), markers or tags commercially available from Sensormatic Co. comprises an in-water-cast amorphous wire with large Barkhausen discontinuity, the peak width was in the range of about 200-500 micro seconds or more. Finally (see FIG. 3A), the peak width was about 1-2 milliseconds for amorphous strips typically used in anti-shoplifting markers or tags, e.g., a Meto GmbH 32-mm marker or tag. Thus, microwires of the type illustrated in FIG. 1 exhibit extremely short re-magnetization peaks which allow discrimination of a microwire response from background noise such as that caused by field interaction with other external objects.

Zhukov et al., J. Mater. Res. 15 No. 10 October (2000), describe the production of multi-bit markers when utilizing multiple amorphous glass-coated wire segments, each having a different dimension (length, gross diameter, etc.) or magnetic property (e.g., coercive field). For instance, if a plurality of magnetic microwire elements exhibit different coercivities, respectively, each of their unique re-magnetization peaks can be detected in each magnetic field period, and their pattern may be recognized, for example, by methods described in U.S. Pat. No. 4,203,544. U.S. Pat. No. 5,729,201 describes a method to differentiate such a plurality of wires, even if they have the same magnetic properties and dimensions. A permanent magnet bias field element in the vicinity of the wire serves to differentiate the amplitude of the external magnetic field generated by a reader that is required to exceed the coercive force for re-magnetization of each magnetic element by way of its different proximity to each individual wire segment. This leads to a phase difference in re-magnetization peaks detected, thus allowing differentiation of the individual elements.

U.S. Pat. No. 4,134,538 describes multi-element tags (markers) constructed of magnetic elements, each characterized by a different coercive force and thereby permitting the assignment to any attached object of a reference code with as many characters as magnetic elements utilized. One thus assigns, respectively, each character of the reference code to a magnetic element in the order of the values of their respective coercive forces, the signals corresponding to each magnetic element then appearing in the detection apparatus in the same order of dephasing as the order of the coercive forces and each with amplitudes corresponding to the values assigned at the time of coding, thus reproducing the complete code in arrangement and in amplitude.

U.S. Pat. No. 6,622,913 teaches that data information may be encoded in binary form by using microwire elements of different diameters or permeabilities, so that they produce considerably different responses to an alternating magnetic field produced by a transmitter. Accordingly, one type of microwire may present binary "0" and the other binary "1". For instance, an array of four microwires each with successively larger coercivities such that they are each easily distinguished by their detected phase differences over a period of an incident alternating magnetic field, can be made to produce alternating high and low amplitudes of field perturbations (and thus alternating high and low voltage amplitudes at the detector) so that they represent a binary pattern of 1010.

U.S. Patent Application No. 2005/0109435 describes several magnetic and optical methods of encoding multi-bit information on a single microwire. The stress sensitivity of ferromagnetic amorphous glass-coated microwire can be used advantageously as the physical basis for affecting magnetic domain structure. Ferromagnetic amorphous glass-coated microwire encoding can result from a localized alteration of this domain structure. The alteration is readily accomplished by imposition of localized stresses or by selective crystallization of the amorphous alloy. Such changes are affected by a number of means, including localized heating via pulsed laser, chemical thinning of the glass coating, coatings on the glass, and the like. Localized modifications of the glass-coating of ferromagnetic amorphous glass-coated microwires can be used to effectively produce controlled changes in the magnetic domain structure of the amorphous alloy cores, thereby enabling encoding. The preferred method is to use laser pulses to locally heat the glass or alloy (independent heating can be accomplished by choice of wavelength) causing changes in the structure of one or both, and thereby altering the extant stress fields or the basic magnetic characteristics.

Prior art EAS or authentication system detector devices used in conjunction with all types of magnetic elements used as magnetic markers typically use field transmitter unit and a magnetic field detector unit. The field transmitter generally has a frequency generator and a field generator coil (constituting together an alternating magnetic field source) for creating the alternating magnetic field in the interrogation zone of the marker. The detector unit normally has a field receiving coil and a signal processing unit that typically triggers an alarm device.

In prior art EAS systems, when a magnetic marker is located in the vicinity of the coils, the interrogating AC field causes the switching of the magnetic element's magnetization. Accordingly, very short pulses of magnetic field perturbations are received by the field receiving coil. These pulses are detected by the signal processing circuit, which produces an output to activate an alarm.

First Embodiment: Modified Chemistry Microwires for Curie Temperature Sensing

The first embodiment of the invention comprises a magnetic microwire temperature sensor having at least one and usually a plurality of magnetically susceptible microwires, with the individual alloys of at least certain of the microwires having modified chemistries and consequent different Curie temperatures, usually below about 400° C. Additionally, this embodiment includes a microwire reader or detector capable of decoding temperature information derived from the sensor microwires.

Chemically modified individual microwires are preferably fabricated so that the modified microwires retain large Barkhausen discontinuities, extremely low coercivities, and extremely high permeabilities below their respective Curie temperatures (with resultant hysteresis behavior of the type depicted in FIG. 2). These modified microwires essentially completely lose their ferromagnetism above their Curie temperatures. Other microwires within the array of the sensor need not have modified chemistries, but can operate as data elements according to any of the prior art methods of single or multi-bit encoding previously discussed.

The most preferred chemical modification of Fe-based and/or Co-based alloys used in prior art amorphous microwires is the adjustment of the atomic percentage of chromium therein. Chromium in amorphous iron-based (Fe80-xCrx) (PC)20 alloys has a sizeable effect on their magnetic properties. An increase in Chromium percentage lowers the Curie temperatures, the average hyperfine fields, and the saturation magnetizations thereof and on the other hand markedly increases their initial permeabilities. For instance, an increase in the Chromium percentage from 0% to 6.5% reduced the Curie temperature from 330° C. to 155° C. in certain tested samples. See, Henry et al., *Magnetic Measurements of Iron-Rich Amorphous Alloys Containing Chromium: Mossbauer Study and B-H Loops*, Journal of Materials Science 19: 1000-06 (1984); and Wijn, *Magnetic Properties of Metals—d-Elements, Alloys, and Compounds*, Springer-Verlag, Berlin (1991).

Other chemical changes to Fe-based and Co-based alloys can also be utilized to alter the magnetic characteristics of amorphous microwire elements. For example, Co can be substituted for Fe in certain FCZBN alloys, and the resultant Curie temperature exhibits an sinusoid-like behavior with increasing Co content, and reveals two maxima at 3 and 12.5 atomic % Co and a minimum at 7.5 atomic % Co (Yao et al., *Co Dependence of Curie Temperature in Amorphous Fe Co Zr B Nb Alloys With High Glass Forming Ability*, Journal of Physical Science: Condensed Matter, Vol. 16 6325-34 (2004). IEEE Transactions on Magnetics, Vol. 22, 1349-51 (1986) presents a process whereby Co—P amorphous alloys with a high P content can be electrolytically obtained. The Curie temperature of these alloys shows a linear behavior in Curie temperature versus composition up to 28-29% P. For higher concentrations, a constant Curie temperature is observed.

Figure 4:
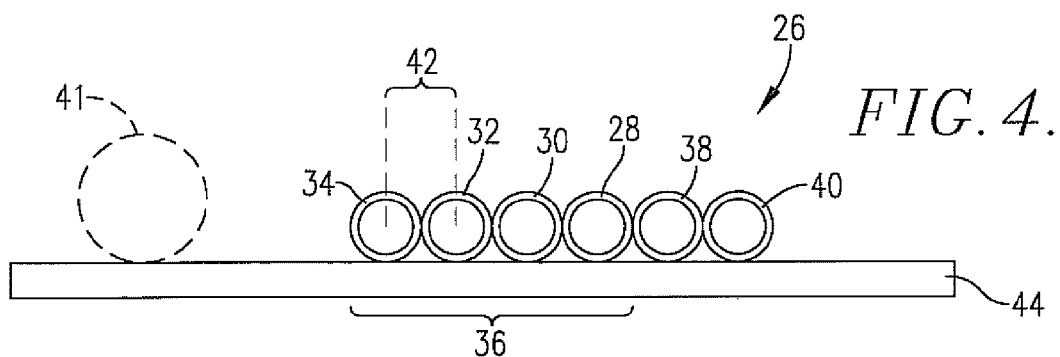
FIG. 4 is an essentially schematic cross-sectional view of a magnetic temperature sensor attached to an object to be sensed and in accordance with a first embodiment of the invention.

As explained above, the first embodiment preferably makes use of a plurality of magnetic microwire temperature sensing elements whose chemistries have been changed so that the microwires become paramagnetic at individual temperatures (usually about 400° C. or below) within specific design temperature range of the overall temperature sensor. For example, FIG. 4 depicts a temperature sensor 26 having a total of four temperature-sensing microwires 28-34 forming an array 36. Each of the microwires 28-34 has its chemistry modified using any of the forgoing techniques such as an increasing atomic percentage of chromium, with the result that the Curie temperatures of the microwires are different and are all exceeded during the normal operating temperature range of the sensor 26. The remaining two microwires 38 and 40 are data elements. An optional permanent magnetic bias field element 41 can also be employed.

In the FIG. 4 embodiment, the microwires 28-34 are arranged in parallel relationship where the spacing 42 is equal to the sum of the radii of each adjacent microwire (spacing 42 may be larger than the sum of the radii), and are held together by a thermally conducting adhesive (not shown) that also adheres the microwires to an object 44 to be temperature-monitored.

In this exemplary embodiment, the magnetic coercivity of each microwire 28-34 and 38-40 is altered by appropriate chemical changes in the alloys thereof, and specifically the chromium content of each alloy, in order to ensure that each of the six microwires is uniquely detectable within each period in the order of their location within the overall array. Of course, other prior art techniques for changing alloy chemistry as well as for adjusting coercivity can also be used for this purpose. Additionally, each of the six microwires 28-34 and 38-40 are of the same length (e.g., 20 mm) except for microwire 38, which is significantly longer (e.g., 40 mm). This extra length for the microwire 38 ensures that the detected re-magnetization peak from this data element microwire is larger in amplitude than all other re-magnetization peaks.

FIG. 10 illustrates an exemplary detector device 46 used to detect temperatures sensed by sensor 26, corresponding to the temperature of the object 44. The detector 46 broadly includes an alternating magnetic field transmitter unit in the form of a frequency generator 48 coupled with a field generator coil 50, such that the transmitter unit is operable to create an alternating magnetic field for interrogating sensor 26. The overall device 46 further includes a field receiving coil 52 operably coupled with a digital signal processing unit 54 and a temperature display 56. As illustrated, the processing unit 54 is equipped with communication ports 58 and 60, and may be operably coupled with frequency generator 48 via connection 62. Additionally, frequency generator 48 may be equipped with an optional input 61 permitting remote control of the generator.

The signal processing unit 54 operates using a decoding algorithm having the capability to decode the magnetic field perturbation information received upon interrogation of the sensor 26. Preferably the decoding algorithm is in the form of one or more look-up tables for different sensors in accordance with the invention, stored within memory associated with the unit 54. In the case of a detector 46 specific to sensor 26, the temperature look-up table would have both the expected phase position (phase relationship from the stop bit and/or from each other) for each of the four temperature sensing microwire elements 28-34, as well as the temperatures to report for each of the acceptable detected bit codes from the array 36 of microwires 20 (some bit codes may be unacceptable because they make no logical sense according to the phased microwire order of Curie temperatures and thus are the product of a mis-read by detector 46).

As described, the sensor 26 and detector device 46 are correlated so that the device 46 can, by proper interrogation of sensor 26, ascertain the temperature of object 44. Such correlation involves matching the bit logic of sensor 26 with the decoding algorithm(s), in this case, the temperature look-up table(s) stored in the memory of signal processing unit 54. Those skilled in the art will appreciate that a wide variety of bit logics and corresponding algorithms tables can be provided. However, the following discussion provides one exemplary system in the context of the sensor 26 and detector device 46 of FIG. 10.

Again referring to FIG. 4, assume that the least significant bit of the four temperature-sensing element microwires 34-38 is microwire 28, which can be denominated the "first" microwire. Thus, when object 44 is below the Curie temperature of the first microwire 28, the microwire 28 will still produce its characteristic short re-magnetization pulse under the influence of the alternating magnetic field generated by device 46. When object 44 has a temperature above the Curie temperature of the first microwire 28, the microwire 28 will no longer produce its short re-magnetization pulse under the influence of the applied alternating magnetic field, and therefore its bit will be missing (a "0" value) from the detected temperature-sensing element array of bits.

The remaining temperature-sensing microwires 30-34 each have respective, chemically modified alloys therein, so that the Curie temperatures of the microwires are successively and in stepwise fashion slightly higher than that of the first microwire 28. Thus, the "second" microwire 30 has a slightly higher Curie temperature than the first microwire 28, and the "third" and "fourth" microwires 32 and 34 each have successive, slightly higher Curie temperatures than the lower-order microwires. In this manner the re-magnetization pulses (bits) of the microwires 30-34 will disappear (i.e., become a "0" value) under the influence of the applied magnetic field from detector 46 at respective temperatures each higher than that of the first microwire 28 and of all preceding lower-order microwires.

For example, if the object 44 has a temperature below the Curie temperatures of both the first and second microwires 28 and 30, all bits of the array 36 will be read (i.e., become a "1" value) by the device 46. If the object 44 has a temperature above the Curie temperature of first microwire 28, but below the Curie temperature of second microwire 30, the first bit will have disappeared to the device 46 as a "0" value, and the remaining bits corresponding to microwires 30-34 will be read as a "1" value by the device 46.

As noted above, the device 46 contains algorithm(s) in the form of look-up table(s) that recognize that the disappearance of the first temperature bit and the appearance of the second and all higher temperature bits means that the temperature of object 44 exists somewhere between the first and second Curie temperatures of the first and second microwires (temperature bits) 28 and 30 (as used herein, detection or determination of sensor or object temperature can refer to a single temperature or an approximated temperature within a range of temperatures). Thus, by reading the temperature-sensing bit data generated by the array 36, and correlating the binary value of this data to the look-up table of interest, the temperature of object 44 can be determined within the temperature range defined by the interval between the first and second microwire Curie temperatures. Of course, this logic applies to all four of the microwires 28-34, of the simple FIG. 4 example.

If the number N of temperature-sensing microwires on a given magnetic element temperature sensor have identified Curie temperatures of known increasing sequential order, and these Curie temperatures are selected to be at least somewhat consistent in their increments from one to another, the sensor can detect temperatures from the first to the $N^{th}$ Curie temperatures. The resolution of such a sensor is the increment between sequential Curie temperatures. It will be appreciated that even if the sequential Curie temperatures are not exactly consistent, the relevant look-up table can be constructed and the sensor can properly function.

The microwire alloys of this embodiment can have their Curie temperatures quantified before or after the alloys have been processed into microwires. In this fashion the complete microwire sensor can be calibrated for temperature sensing. For a given temperature range to be measured, the greater the number of microwires whose Curie temperatures are quantified and are near-equally spaced within the temperature range, the higher the resolution of the microwire temperature sensor. Preferably, temperature sensors in accordance with this embodiment have at least 20 temperature-sensing microwires, each having sequentially higher Curie temperatures, with first to $N^{th}$ microwires and with no more than a 5° C. increment between successive microwires.

In cases where a certain temperature-sensing microwire does not disappear in proper sequence with the other microwires (due to a mis-read by the reader, a lack of thermal contact with the others, or other reason), the lack of an acceptable look-up table value preferably causes the reader algorithm of device 46 to attempt a re-read of the sensor 26. If continuous re-reads show the same anomalous temperature data, the reader algorithm can discard the temperature data, use the last measured temperature (or the last measured temperature plus a delta temperature that is based upon a calculation involving the last measured rate of change of temperature and reading time interval), and then try again at the next scheduled read interval. Preferably, steps are taken to ensure that all microwires make good thermal contact with each other and the object 44 whose temperature is to he measured. One such step is to attach all of the microwires to a thin, thermally conductive substrate. Another step is to employ thermally conductive encasing or potting materials as described hereinafter.

It is known that up to 40 microwires may be detected within a period, and accordingly a magnetic element temperature sensor of this embodiment may contain many more than four temperature-sensing microwires 20 and many more than one (not counting the stop bit) data elements. Data elements, especially if each is encoded with multi-bit data, can be used to store correlation information (such as linear or non-linear relationship constants) that can allow the detector algorithm to decode the "specific numerical value" (temperature bits) to its associated temperature value. This is particularly valuable where a look-up table method is not used. Thus, the magnetic element temperature sensor 26 may store in its data elements data such as a permanent ID code or a "class of object" code. This ability to store a "class of object" code allows a single reader algorithm to read several different types of microwire temperature sensors, each with its own unique look-up table, and still decode the correct temperature.

It will be appreciated that a number of different encoding/decoding strategies can be employed in sensor 26 and device 46 without departing from the scope of the present invention, providing that each temperature-sensing microwires designed to lose its re-magnetization pulse properties under the influence of the alternating magnetic field generated by device 46 above its Curie temperature. One option would be the use of bias field element 41, which serves to differentiate the amplitude of the external magnetic field generated by device 46 that is required to exceed the coercive force for re-magnetization of each microwire, owing to its different proximity to each individual microwire 28-34 and 38-40. This leads to a phase difference in re-magnetization peaks detected by detector 46, thus facilitating differentiation of the six individual microwires. Other variations would include without limitation means to determine a stop or "delineation" bit between temperature-sensing elements and data elements, encoding and decoding of non-temperature data, and differing lengths for some or all of the microwires in order to alter the magnetic responses thereof. Additionally, changes in magnetic properties at temperatures close to the Curie temperatures of the individual temperature-sensing microwires can alter but not entirely eliminate the detectable re-magnetization pulses thereof. Such altered re-magnetization pulses, having predictable behaviors over specific temperature ranges below the Curie temperatures, may also be used to decode temperature information. This can allow each temperature-sensing microwire to accurately sense more than one temperature, e.g., from a small interval below the Curie temperature up until the Curie temperature.

Second Embodiment: Microwires with Ferromagnetic Sheaths for Temperature Sensing This second embodiment comprises a magnetic element temperature sensor 64 having a plurality of composite temperature-sensing microwires 66 each including a magnetically susceptible microwire of the prior art type described above that has no intentional reduction of its Curie temperature, such that it will retain its large Barkhausen discontinuity and other magnetic properties as depicted in FIG. 2 throughout the entire operating range of the sensor 64. This microwire structure further includes a surrounding, tubular, structure 68. The overall second embodiment further includes a microwire temperature detector similar to detector 46 having stored algorithm(s) capable of decoding the temperature information derived from interrogation of the sensor 64.

In particular, each of the composite microwires 66 has an innermost alloy 70 surrounded by an intermediate glass coating 72, such that this inner portions of the composite microwires 66 are conceptually identical with previously described prior art microwires 20. Additionally, the structure 68 of the microwires 66 include a tubular sheath 74 of ferromagnetic metal or Ferrite material (such as NiZn or MnZn) surrounding the coating 72, and an optional outermost glass coating 76 surrounding the tubular sheath 74. The sheath 74 has a Curie temperature carefully chosen so that the individual, inner microwire alloy 70 will produce its signature perturbations (and thus re-magnetization voltage pulses at the detector) only when the microwire is placed in the alternating magnetic field generated by the detector, and then only above the Curie temperature (or above some temperature near the Curie temperature) of the ferromagnetic sheath 74. Hence, when the composite microwire 66 experiences a temperature below the Curie temperature of the ferromagnetic sheath 74 (or below some temperature near this Curie temperature), the sheath 74 is ferromagnetic, thus altering the signature pulse of the microwire 66. This may prevent re-magnetization of the composite microwire 66 owing to magnetic saturation caused by the sheath 74, or may allow the resulting re-magnetization as a biased or "altered" signal from the composite microwire 66. For example, the re-magnetization pulse may be offset in phase from its location above the sheath Curie temperature, or the biasing effect of the sheath may allow altered re-magnetization responses below and above a plurality of different set point temperatures.

When the composite microwire 66 experiences a temperature above the Curie temperature of the sheath 74, the sheath becomes paramagnetic and thus has no effect upon the signature pulse of the alloy 70. Therefore, above the individual Curie temperatures of the sheaths 74 (or above some temperatures near these Curie temperatures), the composite microwires 66 act normally (i.e., they cause the detector 46 to detect a voltage pulse as expected in phase, amplitude or the like, as recorded in a look-up table or via some other decoding algorithm). However, when the composite microwires 66 experience temperatures below the individual Curie temperatures of their sheaths 74, they are either not detectable by the detector, or are detectable but have their magnetic properties altered, especially in relation to signature pulses detected above temperatures of the Curie temperatures of their sheaths 74. Such altered magnetic properties would not fit the parameters of the look-up table or other decoding algorithm, such as phase relationship to an alternating current from the frequency generator 48, or pulse duration.

If the material making up tubular sheath 74 is a ferromagnetic metal, the sheath 74 may be only microns thick or as thick as required for saturation for inner microwire alloy 70, and for manufacturability. One method of forming the ferromagnetic sheath 74 is described in U.S. Pat. No. 7,011,911 entitled "Amorphous Microwire and Method for Manufacture Thereof." Other methods include flame spraying or sputtering. When using these methods for creating the sheath 74, it is not necessary that there be an outermost coating 76. A modified Taylor method may also be employed, wherein an inside glass tube and an outside glass tube are coaxially and telescopically aligned such that the inside glass tube resides within the walls of the outside glass tube. The alloy 70 is inside the center glass tube in ingot (rod-shaped) or constituent metal form, whereas the material making up tubular sheath 74 is located between the interfitted glass tubes. This sheath material may be in ingot (possibly several rods) or constituent metal form. The alloys are heated to molten by magnetic induction or other suitable means and the resultant molten metal and glass is quickly drawn to form a composite microwire 66.

Figure 9:
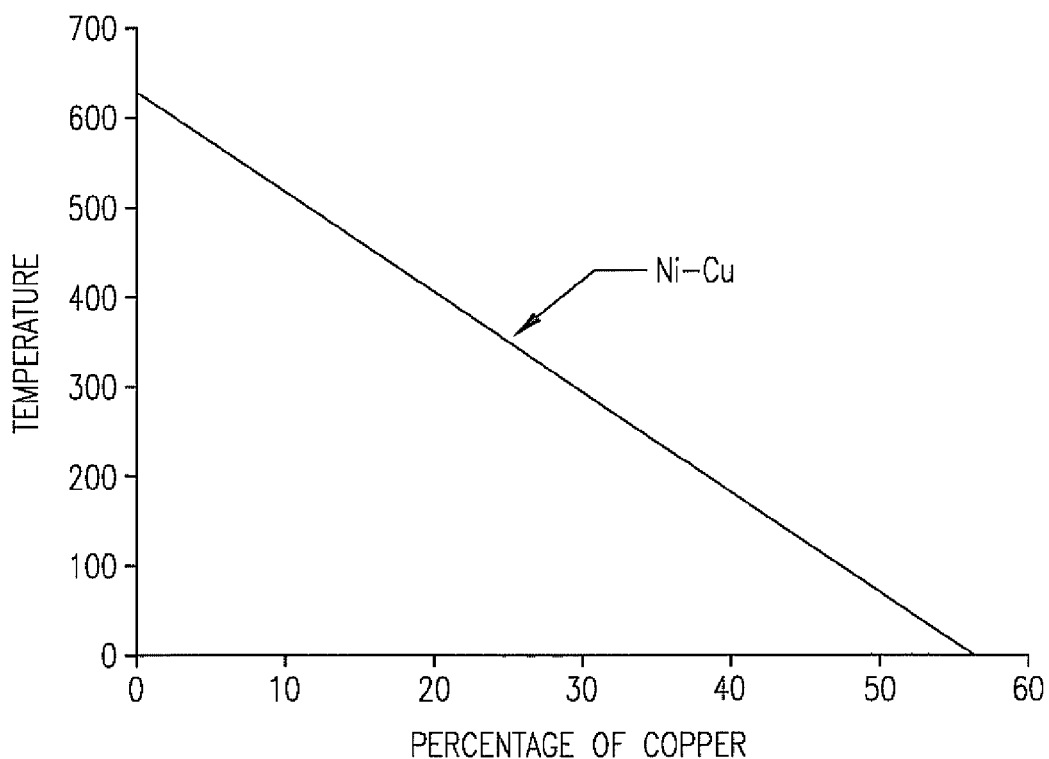
FIG. 9 is a graph illustrating the Curie temperature versus percentage of copper for nickel-copper alloys suitable for use as sheaths for the temperature-sensing elements of the second embodiment of the invention, or as shields for the temperature-sensing elements of the third embodiment of the invention.

Techniques are known in the art for adjusting the Curie temperatures of ferromagnetic alloys by addition of trace elements of specific metals. Thus, any number of alloys may be used to make up the tubular sheaths 74. FIG. 9 illustrates that small additions of certain metals (in this case Copper) to ferromagnetic metal elements (in this case Nickel) so as to form a true alloys can alter the Curie temperature of the resultant ferromagnetic alloys in a predictable way. Also, additions of small amounts of Chromium to Iron yield alloys whose Curie temperatures are predictable. See U.S. Pat. No. 5,954,984, for a discussion on modifying the Curie temperature of Nickel with Copper and Aluminum.

The alloys or Ferrite materials used in the fabrication of the tubular sheaths 74 can have their Curie temperatures (or regulation temperatures near their Curie temperatures) quantified before or after the alloys or Ferrite materials have been processed into tubular sheaths 74. Thus, the magnetic element temperature detector 46 can be readily calibrated for temperature sensing. As before, for a given temperature range to be measured, the more temperature-sensing composite microwires 66 whose sheath Curie temperatures are quantified and are near-equally spaced within the temperature range, the higher the resolution of the temperature sensor. It is preferred to have at least 20 temperature-sensing composite microwires 66, each having a sequentially higher sheath Curie temperature, at most 5° C. above the next lowest order sheath. Of course, if the sheath 74 alters the re-magnetization pulse of the microwire 66 over a range of temperatures near the Curie temperature of the sheath 74 (say, for instance, by detectably shifting the phase of the re-magnetization pulse), it may be possible for the detector to sense and decode multiple temperatures for each microwire 66 within a certain range, thus requiring fewer microwires 66 to allow a sensor to accurately measure temperatures over a wide range.

If the material making up the tubular sheaths 74 is a Ferrite or some blend of materials with Ferrite, then the sheath may either be adhered to the glass layer 72, a separate cylindrical bead, or other sintered Ferrite cylindrical object with a central hole such that the alloy 70 and surrounding glass 72 may be placed therein. Alternately, the tubular sheath 74 could be formed as a part of the glass layer 72 by using a glass-ferrite material for layer 72 in lieu of pure glass. U.S. Pat. No. 6,909,395 entitled "Radar Absorbing Coatings" describes Ferrite/glass composite material that can be used to either adhere directly to a metal wire or other shape of metal object, or can be adhered to a layer of pure glass that is already adhered to the metal.

Referring now to FIG. 6, the sensor 64 includes a plurality of microwires 20 presenting an array 78 of data elements, and a plurality of temperature-sensing composite microwires 66 forming an array 80 thereof. The microwires 20 and composite microwires 66 are attached to a sensor or tag substrate 82, which is as thin and as thermally conductive as possible so that the sensor 64 may be placed in intimate thermal contact with an object (not shown) for temperature measurement purposes.

The microwires 20 making up array 78 have chemistries giving individual Curie temperatures above the planned operating temperature range usually less than about 400° C. for the sensor 64. The composite microwires 66 within array 80 are preferably spaced apart by a distance 84, such that the ferromagnetic or Ferrite tubular sheath 74 of each individual composite microwire 66 does not affect its neighbor composite microwire once the tubular sheath 74 of the individual microwire experiences a temperature above its Curie temperature.

In this simple embodiment, assume that each data element of array 78 is laser coded to a logic state of "1" or "0." Furthermore, assume that each of the data elements is the same length (say, 20 mm) except for terminal elements 83 and 86, which are significantly longer (say 40 mm). This extra length ensures that the detected re-magnetization peaks from data elements 83 and 86 are larger in amplitude than the others. Finally, assume that the data element 83 is laser coded to a logical "1" value whereas data element 86 is laser coded to a logical "0" value. As described in the first embodiment, each of the elements of both arrays 78 and 80 are made so that the detected phase order matches the depicted alignment order from top (microwire 83) to bottom (composite microwire 88), the latter having the highest sheath Curie temperature of the composite microwires of the array 80. In such case, the detector 46 assigns the first detected pulse (in phase relationship) with the highest amplitude with a logic level "1" as the start bit (here depicted as microwire 83) and the last detected data microwire 86 with highest amplitude and with a logic level "0" as the stop bit. All data microwires between the start and stop bits 83 and 86 are detected by the microwire temperature reader as data bits. The intervening data microwires can be used, as described in the first embodiment, for a variety of functions such as tag identification number and "class of object" code.

In order to decode the temperature information from sensor 64, assume there are "N" composite microwires from the array 80 that have ferromagnetic sheaths 74 such that all of the respective sheaths 74 have Curie temperatures which are exceeded (or have regulation temperatures "near" the Curie temperatures) during the normal operating range of the sensor 64. The least significant bit of these N composite microwires 66, detected in phase relationship just after the stop bit 86, and at a specified phase relationship from the stop bit 86, is deemed the "first" composite microwire 89. Thus, the first composite microwire 89 will begin producing its normal short pulse perturbation only at temperatures above the Curie temperature of its sheath 74, and hence the detector 46 will only then detect its voltage pulse (bit). The first composite microwire 89 will not produce its normal short pulse perturbation below the Curie temperature of its sheath 74, and therefore its bit will either be missing from the bits detected by detector 46, or its pulse will be so altered as to be clearly detectable by the detector 46 as an "altered" microwire.

A "second" composite microwire 90 in phase relationship from the stop bit 86 (the next-to-least significant bit) has a ferromagnetic sheath 74 of slightly higher Curie temperature than that of the first composite microwire 89. The bit of composite microwire 90 will not be read by the detector 46 or its voltage signal will be detected as "altered" at temperatures below this higher sheath Curie temperature (or higher temperature near the sheath Curie temperature), but will appear as expected in phase and duration at a higher temperature than that of the first composite microwire 89.

Thus, if the sensor 64 is subjected to a temperature below that of the Curie temperatures (or designated temperatures below the Curie temperatures) of both the first and second composite microwires 89 and 90, no composite microwires will be detected by the detector 46 (assuming that all subsequent higher order composite microwires in array 80 have sheaths 74 with a higher Curie temperature). If the sensor 64 is subjected to a temperature above the sheath Curie temperature (or related temperature) of the first composite microwire 89 but below the sheath Curie temperature (or related temperature) of the second composite microwire 90, the first bit will be read by the detector 46 but the second bit will either still not be read by the detector 46 or will have an "altered" signal as read by the detector. Finally, if the sensor 64 is subjected to a temperature higher than the sheath Curie temperature (or related temperature) of both the first and second composite microwires 89 and 90, both the first and second composite microwires will be read by the detector 46.

The detector 46 contains a decoding algorithm that recognizes that the appearance of the first temperature bit of first composite microwire 89, but the lack (or alteration of) of the second temperature bit of second composite microwire 90, and thus signals via display 56, that the sensor temperature exists somewhere between the first sheath Curie temperature and the second sheath Curie temperature. Thus, if the sensor 64 is placed in intimate thermal contact with an object whose temperature is of interest, then by reading the composite microwire array bit output of the sensor 64, the detector 46 determines the object's temperature within the temperature range defined by the interval between the first and second sheath Curie temperatures (or between their respective temperature near their Curie temperatures).

If the number of composite microwires 66 on the sensor 64 have sheath Curie temperatures known to be in increasing sequential order is increased to "N" composite microwires, and these sheath Curie temperatures are selected to be at least somewhat consistent in their increments from one another, the sensor 64 has detectable temperature range from the first to the $N^{th}$ sheath Curie temperatures, and has a temperature resolution defined by the increment between sequential sheath Curie temperatures.

More generally, the detector 46 decoding algorithm is built to understand that the appearance of the first through the $N-1^{th}$ temperature bits generated by the corresponding composite microwires 66 in their normal pulse state, together with the lack of the $N^{th}$ temperature bit corresponding to $N^{th}$ composite microwire 66 in its normal pulse state, establishes that the sensor temperature exists somewhere between the $N-1^{th}$ sheath Curie temperature and the $N^{th}$ sheath Curie temperature (or between their respective temperatures near the sheath Curie temperatures). The detector algorithm preferably reports this sensor temperature to be the midway temperature between $N-1^{th}$ and $N^{th}$ Curie temperatures.

Preferably, the acceptable composite microwire bit patterns and their corresponding sensor temperatures are stored in a look-up table within the memory of detector 46. Thus, when an acceptable bit pattern is detected by detector 46 from a correlated sensor 64, this pattern is compared against the look-up table to find the correlating sensor temperature.

In cases where one or more composite microwires 66 of array 80 do not appear in their normal state in proper sequence with the others (due to a mis-read by the detector 46, a lack of thermal contact with the other composite microwires, or some other reason), the detector algorithm preferably attempts a re-read of the sensor 64. If continuous re-reads show the same anomalous bit pattern, the detector algorithm can discard the temperature data, use the last measured temperature (or the last measured temperature plus a delta temperature that is based upon a calculation involving the last measured rate of change of temperature and reading time interval), and then try again at the next scheduled read interval.

Third Embodiment: Microwires with Seperate but Adjacent Ferromagnetic Saturation Elements for Temperature Sensing The third embodiment is conceptually very similar to the second embodiment and differs in the use of ferromagnetic sheath saturation or biasing elements as separate entities which do not need to touch the surface of the adjacent temperature-sensing microwires, as compared with the sheaths 74 of the second embodiment which are bonded or otherwise affixed to central microwire structure. Referring to FIG. 7, a combination microwire 92 is illustrated and includes a microwire 20 of the type previously described that has no intentional reduction of its Curie temperature, such that it will retain its large Barkhausen discontinuity and other magnetic properties as depicted in FIG. 2 throughout the entire operating range of the sensor. Also, the combination microwire 92 includes an adjacent ferromagnetic sheath 94. The sheath 94 is located near enough to the associated microwire 20 so as to prevent by magnetic saturation or biasing re-magnetization of the microwire 20 and consequent generation of its signature perturbation until the combination microwire 92 experiences a temperature above the Curie temperature (or above some temperature near the Curie temperature) of the sheath 94. Again, as in the case of the second embodiment, the sheath 94 can be designed so that the associated microwire 20 will exhibit a series of different re-magnetization responses below and above different set point temperatures below the sheath Curie temperature, and if desired such multiple different responses can be used for temperature sensing and determination.

In more detail, the sheath 94 is preferably in the form of a thin rectangular sheet of ferromagnetic metal whose size is not significantly wider than that of the associated microwire 20, and whose flat surface may be bent into a half-round shape (or, in the case Ferrite, may be sintered into a half-round or some other suitable shape). The Curie temperature of the shield 94 is carefully chosen so that the associated microwire 20 will produce its signal perturbation (and thus a re-magnetization pulse of voltage) when the combination microwire 92 is placed in an alternating magnetic field of the detector 46 and only when the combination microwire 92 experiences a temperature above the Curie temperature (or above some fixed temperature near the Curie temperature) of the sheath 94. The sheaths 94 need only be microns thick or as thick as needed for saturation of the associated microwire 20, and for ease of manufacturing. The same types of alloys or Ferrites described in connection with the second embodiment may be used in the fabrication of sheath 94. Furthermore, magnetic inks (using either ferromagnetic powder or Ferrite powder) are also suitable and have the advantage of being printable on a supporting substrate for the combination microwires 92.

Referring to FIG. 8, a temperature sensor 96 is illustrated, which is in all respects identical with sensor 64, save for the use of combination microwires 92 in lieu of the composite microwires 66. Accordingly, like reference numerals from FIG. 6 are used in FIG. 8 to denote identical components, and an "a" designation has been used to distinguish the combination microwires 92 from the composite microwires 66.

The operation of sensor 96 is identical to that of sensor 64, and makes use of a similar detector 46 having appropriate decoding algorithms (preferably look-up tables) correlated with the sensor 96. Accordingly, a detailed description of this operation is unnecessary.

Figure 4A:
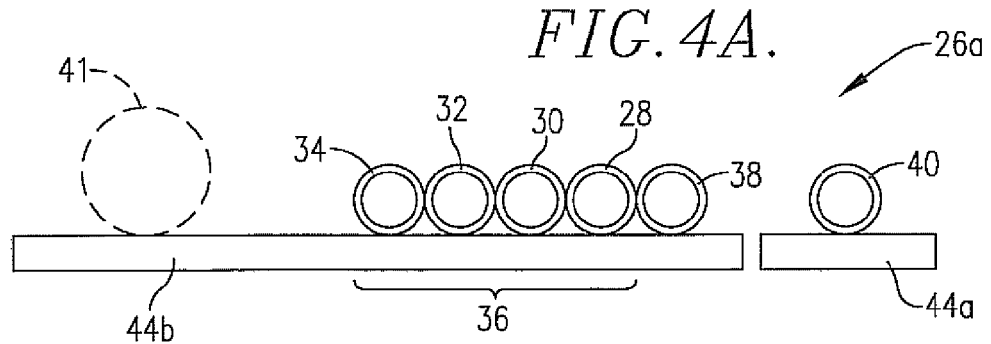
FIG. 4A is an essentially schematic cross-sectional view similar to that of FIG. 4, but illustrating the components of a magnetic microwire temperature sensor split between two objects designed for placement in proximity to each other.

The above-described three embodiments, and indeed other embodiments within the scope of the present invention, can be varied in a number of different respects. For example, FIG. 4A depicts an alternative arrangement advantageous for some product applications. Specifically, in FIG. 4A a sensor 26a is provided wherein the microwire data element 40 is attached to a first object 44a, whereas the remaining data microwire 38 and the temperature-sensing microwires 28-34, and optional bias element 41, are attached to a second object 44b. The bit logic of sensor 26a is identical with that of sensor 26, meaning that, even though the components of the sensor 26a are separated onto objects 44a and 44b, the overall sensor 26a will only operate when all of the sensor components are within the alternating magnetic field generated by detector 46. If this condition does not exist, then no successful reading using the detector 46 can occur. This construction can be used, for example, to control heating of a two-part object by a heater only if the heater's detector detects both part of the sensor (and thus both objects 44a and 44b), and to correspondingly prevent any heating unless both parts of the sensor are present and within the magnetic field of detector 46. In such a case the heater control would typically be coupled with the signal processing unit 54 of detector 46.

Of course, this same design concept maybe used when more than two objects are present. Additionally, more sophisticated data encoding methods such as those described above may be used to correlate one or more pieces of the overall sensor 26a with matching pieces thereof. Such methods may include laser encoding the first data element 40, with a matching multi-bit code for stop data bit 38.

Although the FIG. 4A alternative has been described with reference to sensor 26 of the first embodiment, it will be appreciated that the same modification may be used with sensors 64 and 96 of the second and third embodiments if desired.

The microwires forming a part of the sensors 64 and 96, just as in the case of the microwires 20 of sensor 26, may be bound onto an object 44 or a thermally conductive substrate such as substrate 82 using an appropriate adhesive. In another alternative, the microwires 20, composite microwires 66 and/ or combination microwires 92 may be encased in very thin, non-ferromagnetic, thermally conductive material such as a graphite-filled polymer material that is compression or injection moldable, such as one within the family of materials sold by SGL Carbon under the designation RIDURID®. Other useable high-temperature materials include ceramic potting materials sold by Aremco under the designation Ceramameast 510, or other flexible high-temperature polymers. With use of such materials the thickness and overall thermal mass of the encasing material should be kept to a minimum in order to minimize thermal lag between the object to he temperature monitored and the core alloy materials of the microwires.

Additionally, the microwires of the described embodiments may be twisted into a thread or woven into the structure of an object to be temperature-monitored if appropriate. For instance, the microwires may be woven into a carbon fabric cloth, so long as good thermal contact can be maintained and suitable art means are used to distinguish each temperature-changing element from each other and from each of the distinctly identified data elements (to include a stop bit).

Closed-Loop Feedback System for Heating Devices

The magnetic element temperature sensors and associated detectors of this invention can easily be used in place of the RFID tag and associated RFID reader, respectively, in the closed-loop temperature regulating induction heating systems described in U.S. Pat. Nos. 6,320,169 and 6,953,919.

Thus, a myriad of heating applications maybe accomplished with a temperature-regulating magnetic element technology induction heating system which is similar to the prior RFID systems but with the RFID components replaced by the present sensor and detector components. For instance, a smart range such as described in U.S. Pat. No. 6,953,919, a thermal dispensing system as described in U.S. Pat. No. 6,822,204, a food delivery system such as described in U.S. Pat. Nos. 6,504,135, 6,444,961, 6,274,856, and 6,232,585, and various warming devices such as cups, bowls, sizzle platters, plates, ski boots and other items described in U.S. Pat. No. 5,954,984 can be modified in accordance with the present invention. Furthermore, the same components (sensor and detector) can be integrated into other types of closed loop heating systems that are not induction based, such as closed-loop temperature controlled infrared, halogen and resistive heating systems.

Figure 11:
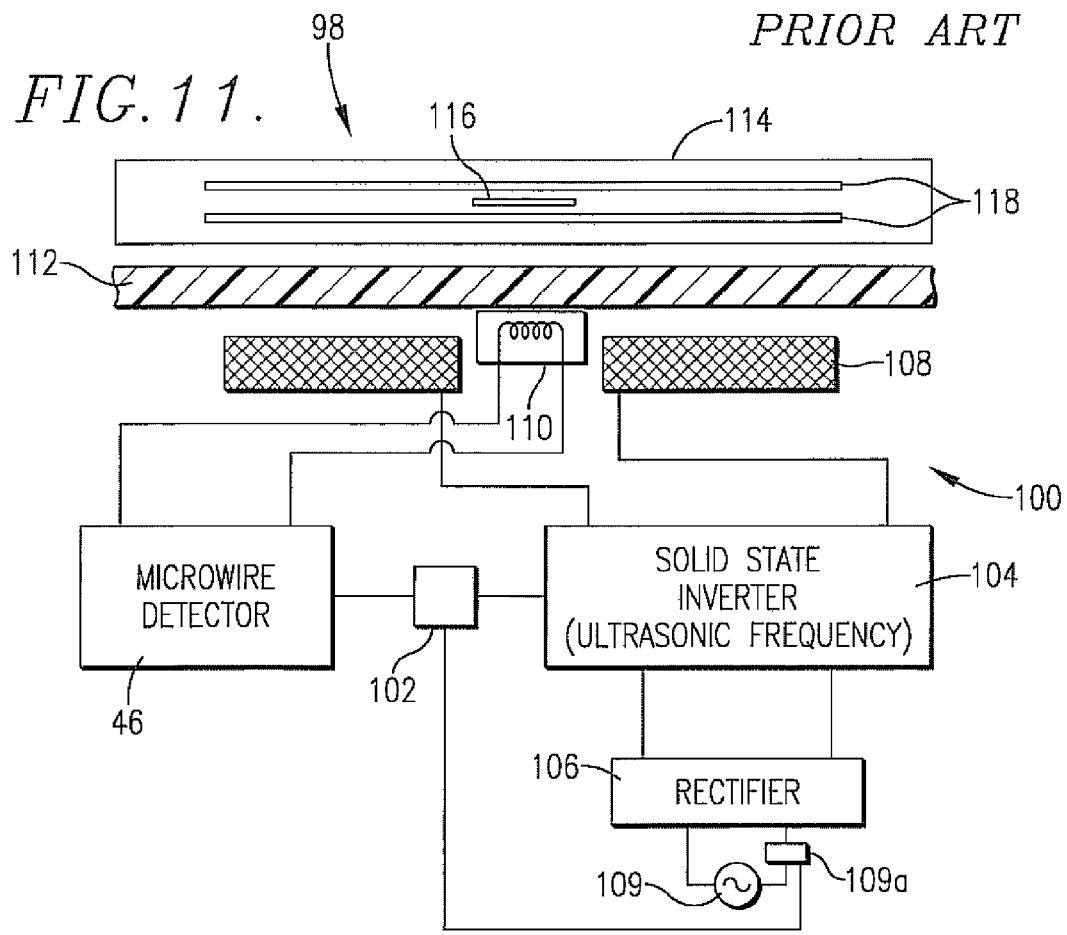
FIG. 11 is a schematic diagram illustrating magnetic element sensor-based, closed-feedback temperature control induction heating unit in accordance with the invention.

Referring to FIG. 11, a closed-loop induction heating system 98 includes a microwire detector 46 (see FIG. 10) incorporated into an induction heating device 100 in lieu of an RFID reader. The device 100 includes a control microprocessor 102 operably coupled with detector 46, solid state inverter 104, and rectifier 106, as well as an induction work coil 108 coupled to inverter 104. An AC power source 109 and current sensor 109a are operably coupled with rectifier 106. The field generator and receiving coils 50 and 52 are integrated into a sensor component 110 located beneath a support element 112.

The system 98 is designed to control the temperature of a graphite heating disk 114 such as described in U.S. Pat. No. 6,657,170 having on or more embedded microwire sensors 116 of the present invention. The disk 114 has graphite layers 118 above and below sensor 116 as shown. Of course, any other induction-heatable object can be controlled instead of the disk 114, such as a multiple-ply cooking utensil (pot or pan, for example) having one or more embedded sensors 116 therein. The feedback of temperature information from the sensor(s) 116 is detected by the detector 46 and this information call be used to control the induction heating of disk 114 via control microprocessor 102.

If desired, the microwire sensors and detectors of the invention maybe used to control other types of heating devices such as halogen or resistive heaters, or gas or electric ranges.

Each of the patents and literature references mentioned herein are specifically and fully incorporated by reference into this disclosure.

The invention claimed is:

1. A system for heating an object, comprising:
a temperature sensor designed for placement in thermal contact with said object and operable for sensing the temperature of said object, said sensor comprising at least one magnetically susceptible sensor element, said sensor element operable to generate a temperature-sensitive re-magnetization response under the influence of an applied alternating magnetic field, said re-magnetization response being correlated with the temperature of said object and being different below and above a set point temperature;
apparatus for heating said object;
a detector including a device operable to generate said alternating magnetic field, and a device operable to detect said temperature-sensitive re-magnetization response generated by said at least one temperature sensor and to generate an output signal correlated with said detected re-magnetization response; and
a controller coupled with said detector and said heating apparatus and operable to receive said output signal and to control the operation of said heating apparatus in response to the output signal.

2. The system of claim 1, said heating apparatus comprising an induction heating unit.

3. The system of claim 1, said temperature sensor having a re-magnetization response defined by at least one short, detectable pulse of magnetic field perturbation of defined duration, said set point temperature being below about 400° C.

4. The system of claim 1, there being a plurality of said sensor elements, with at least certain of the sensor elements having a different set point temperature than other of the sensor elements.

5. The system of claim 1, said sensor comprising an amorphous metallic body.

6. The system of claim 5, said metallic body being in the form of an elongated wire or thin strip having a maximum cross-sectional dimension of up to about 100 µm.

7. The system of claim 5, said metallic body formed of an alloy selected from the group consisting of Fe-based alloys, Co-based alloys, and mixtures thereof, said alloy having chromium therein.

8. A system for heating an object, comprising:
a temperature sensor designed for placement in thermal contact with said object and operable for sensing the temperature of said object, said sensor consisting essentially of at least one amorphous or nanocrystalline metallic microwire body, said body being magnetically susceptible and operable to generate a re-magnetization response under the influence of an applied alternating magnetic field, said re-magnetization response being correlated with the temperature of said object and being different below and above a set point temperature;
apparatus for heating said object;
a detector including a device operable to generate said alternating magnetic field, and a device operable to detect said temperature-sensitive re-magnetization response generated by said at least one temperature sensor and to generate an output signal correlated with said detected re-magnetization response; and
a controller coupled with said detector and said heating apparatus and operable to receive said output signal and to control the operation of said heating apparatus in response to the output signal.

9. The system of claim 8, said temperature sensor having a re-magnetization response defined by at least one short, detectable pulse of magnetic field perturbation of defined duration, said set point temperature being below about 400° C.

10. The system of claim 8, there being a plurality of said sensor elements, with at least certain of the sensor elements having a different set point temperature than other of the sensor elements.

11. The system of claim 8, said sensor comprising an amorphous metallic body.

12. The system of claim 11, said metallic body being in the form of an elongated wire or thin strip having a maximum cross-sectional dimension of up to about 100 µm.

13. The system of claim 11, said metallic body formed of an alloy selected from the group consisting of Fe-based alloys, Co-based alloys, and mixtures thereof, said alloy having chromium therein.

* * * * *